US008190322B2

(12) United States Patent
Lin et al.

(10) Patent No.: US 8,190,322 B2
(45) Date of Patent: May 29, 2012

(54) AUTONOMOUS VEHICLE MAINTENANCE AND REPAIR SYSTEM

(75) Inventors: William C. Lin, Birmingham, MI (US); Bakhtiar Brian Litkouhi, Washington, MI (US); Ansaf I. Alrabady, Livonia, MI (US); Balarama V. Murty, West Bloomfield, MI (US); Xiaodong Zhang, Mason, OH (US); Steven W. Holland, St. Clair, MI (US); Mutasim A. Salman, Rochester Hills, MI (US); Rami I. Debouk, Dearborn, MI (US); Yuen-Kwok W Chin, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 561 days.

(21) Appl. No.: 12/353,016

(22) Filed: Jan. 13, 2009

(65) Prior Publication Data

US 2010/0179720 A1 Jul. 15, 2010

(51) Int. Cl.
*G06F 19/00* (2006.01)

(52) U.S. Cl. ..................... 701/31.5; 701/29.1; 701/31.4; 701/31.6

(58) Field of Classification Search .................... 701/29, 701/33, 35, 29.1, 29.3, 31.4, 31.5, 31.6, 32.9, 701/34.3
See application file for complete search history.

(56) References Cited

U.S. PATENT DOCUMENTS

| | | | | |
|---|---|---|---|---|
| 5,442,553 | A * | 8/1995 | Parrillo | 455/420 |
| 6,115,580 | A * | 9/2000 | Chuprun et al. | 455/1 |
| 6,150,961 | A * | 11/2000 | Alewine et al. | 340/995.1 |
| 6,181,994 | B1 * | 1/2001 | Colson et al. | 701/33 |
| 6,317,682 | B1 * | 11/2001 | Ogura et al. | 701/117 |
| 6,487,717 | B1 * | 11/2002 | Brunemann et al. | 717/173 |
| 6,801,837 | B2 * | 10/2004 | Carlstedt et al. | 701/1 |
| 6,868,333 | B2 * | 3/2005 | Melen | 701/200 |
| 6,933,842 | B2 * | 8/2005 | Oesterling et al. | 340/539.24 |
| 6,975,612 | B1 * | 12/2005 | Razavi et al. | 370/338 |
| 7,155,321 | B2 * | 12/2006 | Bromley et al. | 701/29 |
| 7,212,893 | B2 * | 5/2007 | Doherty et al. | 701/33 |
| 7,430,218 | B2 * | 9/2008 | Lee et al. | 370/464 |
| 2002/0030611 | A1 * | 3/2002 | Nuesser et al. | 340/992 |
| 2002/0103583 | A1 * | 8/2002 | Ohmura et al. | 701/33 |
| 2004/0082350 | A1 * | 4/2004 | Chen et al. | 455/518 |
| 2004/0128062 | A1 * | 7/2004 | Ogino et al. | 701/200 |
| 2004/0214599 | A1 * | 10/2004 | Ogino | 455/556.1 |
| 2004/0230373 | A1 * | 11/2004 | Tzamaloukas | 701/208 |
| 2005/0003844 | A1 * | 1/2005 | Nishiga et al. | 455/517 |
| 2005/0060070 | A1 * | 3/2005 | Kapolka et al. | 701/29 |
| 2005/0085964 | A1 * | 4/2005 | Knapp et al. | 701/33 |

(Continued)

*Primary Examiner* — Darnell Jayne
*Assistant Examiner* — Sasha T Varghese
(74) *Attorney, Agent, or Firm* — John A. Miller; Miller IP Group, PLC

(57) ABSTRACT

A system and method for providing autonomous and remote vehicle maintenance and repair. The system employs an on-board diagnosis and prognosis module that monitors one or more vehicle buses to identify trouble codes and other information indicating a vehicle problem. The on-board module causes a telematic device on the vehicle to broadcast a message including a problem code that identifies the problem the vehicle is having. A remote repair center may receive the message and may identify a software upgrade patch associated with the problem that can be transmitted to the vehicle to upgrade its software to correct the problem. Also, the message may be received by another vehicle that is part of a broadcast network that has previously received the software upgrade patch to fix a problem on that vehicle, where the receiving vehicle may transmit the software upgrade patch to the vehicle having the problem.

17 Claims, 1 Drawing Sheet

U.S. PATENT DOCUMENTS

| | | | | |
|---|---|---|---|---|
| 2005/0090941 | A1 * | 4/2005 | Stefan et al. | 701/1 |
| 2005/0129410 | A1 * | 6/2005 | Wilsey et al. | 398/153 |
| 2005/0216903 | A1 * | 9/2005 | Schaefer | 717/168 |
| 2006/0294514 | A1 * | 12/2006 | Bauchot et al. | 717/173 |
| 2007/0005609 | A1 * | 1/2007 | Breed | 707/10 |
| 2007/0115868 | A1 * | 5/2007 | Chen et al. | 370/315 |
| 2007/0168090 | A1 * | 7/2007 | DeMarco et al. | 701/23 |
| 2008/0040023 | A1 * | 2/2008 | Breed et al. | 701/117 |
| 2008/0089298 | A1 * | 4/2008 | Anschutz et al. | 370/338 |
| 2008/0095134 | A1 * | 4/2008 | Chen et al. | 370/342 |
| 2008/0140278 | A1 * | 6/2008 | Breed | 701/29 |
| 2008/0161989 | A1 * | 7/2008 | Breed | 701/29 |
| 2008/0279141 | A1 * | 11/2008 | Luss et al. | 370/329 |
| 2008/0291014 | A1 * | 11/2008 | Chigusa et al. | 340/540 |
| 2009/0170434 | A1 * | 7/2009 | Tengler et al. | 455/41.2 |

* cited by examiner

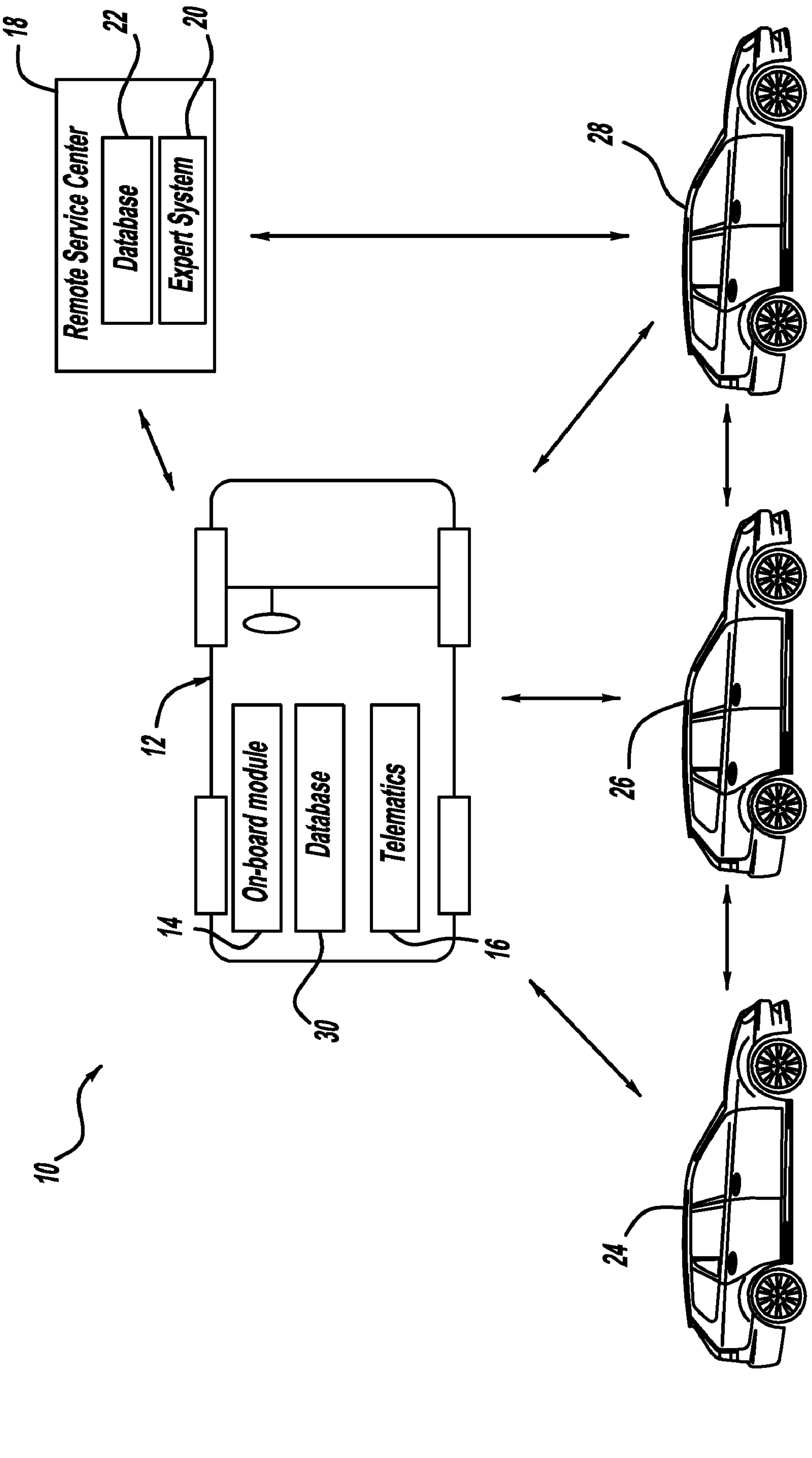
Remote Service Center
Database
Expert System
On-board module
Database
Telematics
18
22
20
28
12
26
14
30
16
10
24

AUTONOMOUS VEHICLE MAINTENANCE AND REPAIR SYSTEM

BACKGROUND OF THE INVENTION

1. Field of the Invention

This invention relates generally to a system and method for autonomously maintaining and repairing a vehicle and, more particularly, to a system and method for autonomously providing vehicle maintenance and repair by employing an on-board diagnosis and prognosis system that detects vehicle problems and providing wireless communications to download updated software patches to the vehicle that may provide the maintenance or repair.

2. Discussion of the Related Art

Bringing a vehicle to a service garage for warranty or other service is generally not something a vehicle owner likes to do, especially when the vehicle owner expects the vehicle to perform as was intended. Many of the warranty service problems not only reduce customer satisfaction toward the purchased vehicle due to inconvenience, but these problems may continue to erode the customer's trust of the manufacturers overall quality and thus market share.

Advancements in electronics and control software (ECS) technology has started to change the landscape of vehicle functionality and use. On one hand, many of the added values to the customers from such technology are derived from integration of components and systems, as well as sub-functions and functions, in which complexity can result and vulnerability to errors is a risk. On the other hand, in-vehicle diagnosis and prognosis (D&P) systems can be developed utilizing ECS technologies including control and communication. The advancement of D&P systems opens up an avenue for the possibility of understanding the vehicle state and health, thus facilitating the necessary steps or actions to bring the vehicle back to good performance.

It is the purpose of the present invention to provide a vehicle repair and maintenance system, where the customer may not need to bring the vehicle to the service garage for warranty or other service.

SUMMARY OF THE INVENTION

In accordance with the teachings of the present invention, a system and method are disclosed for providing autonomous and remote vehicle maintenance and repair. The system employs an on-board diagnosis and prognosis module that monitors one or more vehicle buses to identify trouble codes and other information indicating a vehicle problem. The on-board module causes a telematic device on the vehicle to broadcast a message including a problem code that identifies the problem the vehicle is having. A remote repair center that employs an expert system for identifying vehicle problems may receive the message and may identify a software upgrade patch associated with the problem that can be transmitted to the vehicle to upgrade the software to correct the problem. Also, the message may be received by another vehicle that is part of a broadcast network that has previously received the software upgrade patch to fix a problem on that vehicle, where the receiving vehicle may transmit the software upgrade patch to the new vehicle having the problem. Further, the vehicle communications network may transfer the message from vehicle to vehicle to identify a vehicle that has the software upgrade patch, or that may be in communication with the remote repair center.

Additional features of the present invention will become apparent from the following description and appended claims, taken in conjunction with the accompanying drawings.

BRIEF DESCRIPTION OF THE DRAWING

FIG. 1 is an illustration of an autonomous vehicle maintenance and repair system showing a vehicle in communication with a remote repair center and other vehicles that may provide a software upgrade patch to correct a problem on a sending vehicle.

DETAILED DESCRIPTION OF THE EMBODIMENTS

The following discussion of the embodiments of the invention directed to a system and method for providing autonomous vehicle maintenance and repair by downloading software upgrade patches to the vehicle is merely exemplary in nature, and is in no way intended to limit the invention or its applications or uses.

As will be discussed in detail below, the present invention proposes an autonomous vehicle maintenance and repair system that identifies a vehicle problem by monitoring vehicle trouble codes and other information, identifies a potential software upgrade that may address the problem and remotely downloads the software upgrade to the vehicle to repair the problem or service the vehicle.

The autonomous vehicle maintenance and repair system may include the following systems: (1) database systems containing software algorithms for vehicle problem resolutions and infrastructure installation and distributed databases residing in vehicles; (2) an on-board diagnosis and prognosis system identifying vehicle problems and generating a problem code to be used in an inquiry for a software upgrade patch; (3) a vehicle communications system with designated communication protocols to broadcast inquiries for needed software and to relay messages among peer vehicles, which may or may not have the needed software in their database; and (4) control software patches for the problems recognizable with the designated problem codes generated by the on-board diagnosis and prognosis system.

FIG. 1 is a representative illustration of a vehicle communications network and an autonomous vehicle maintenance and repair system 10 of this type. The system 10 includes a subject vehicle 12 including an on-board diagnosis and prognosis module 14 that is continually monitoring vehicle buses and ECUs for trouble codes indicating a potential vehicle problem with any vehicle component, sub-system or system that the designers wish to monitor, such as battery charge, generator status, transmission schedule, etc. If a trouble code is placed on the vehicle bus and is identified by the on-board module 14 indicating a potential problem, which may not yet be identifiable to the vehicle operator, the on-board module 14 assigns a problem code associated with that problem and can send a signal to a telematics unit 16 on the vehicle 12, which will then broadcast a message wirelessly throughout the system 10 identifying the potential problem and requesting a software fix, if available. Information collected and processed by the on-board module 14 can be stored in a database 30 on the vehicle 12.

In one application, the message is received by a remote service center 18 including an expert system 20. The expert system 20 is programmed to identify the problem codes broadcast by vehicles in the network, and identify software fixes for the problem that may be available. The service center 18 includes a database 22 that may store the upgrade software patches that can be transmitted back to the vehicle 12 and be loaded by the on-board module 14 in an attempt to correct the problem in a manner as discussed herein.

Additionally, the vehicle 12 can communicate with other vehicles 24, 26 and 28 in the network in an attempt to correct the problem. One or more of the vehicles 24, 26 and 28 may have experienced the same problem and may have been corrected at a dealership, or telematically, with a software upgrade for that problem, which may be stored on the vehicle, that can be transmitted back to the vehicle 12. The other vehicles 24, 26 and 28 can relay the message from one to another to another, theoretically to all of the vehicles in the network, until a vehicle that includes the software upgrade patch stored on the vehicle is found. The software upgrade patch can then be transmitted back to that vehicle 12 with the problem in the same manner, where each vehicle that receives the software upgrade patch can store it in its database, and use it in the future if that vehicle experiences the same problem or provide it to other vehicles with the same problem. Also, the vehicle 12 may not be in direct contact with the service center 18, and may use hopping of the message from one vehicle to another vehicle to the service center 18 in order to receive a software upgrade patch.

The network of vehicles illustrated by the system 10 shows that each vehicle in the network may be in communication with other vehicles in the network either directly or through other vehicles, where a message transmitted from one vehicle and received by another vehicle may be retransmitted by vehicles in between in a hopping fashion. Therefore, when the vehicle 12, or the vehicles 24-28, has a problem and identifies the problem with a problem code, that code can be transmitted into the network with a request for a software fix to the other vehicles to determine if one is available. The vehicle with the problem may not actually be in communication with the service center 18 because it is unavailable, out of range, etc. Further, vehicles in the network may include databases that store the software patch for a particular identified problem code. Therefore, the present invention contemplates a vehicle that broadcasts a particular problem code that is received by other vehicles in the network or by the service center 18 and that may receive a software upgrade patch directly from one of the other vehicles, directly from the service center 18, from the service center 18 through multiple hops of the vehicles in the network or from other vehicles in the network through multiple hops from vehicle to vehicle.

The vehicle 12 utilizes the on-board module 14 to identify vehicle problems and generate a problem code. The vehicle 12 uses its communication system to broadcast an inquiry for a software patch that could fix the problem. The communications can be made through vehicle-to-vehicle (V2V) or vehicle-to-infrastructure (V2I) networks. While there is no guarantee that the first-level communication can meet the need for a problem fix, where the first peer vehicle to be contacted happens to have the software patch in its distributed database, the query will need to be relayed to the other vehicles 24-28 as well as to the infrastructure. Once there exists an applicable software patch and it is so recognized, this software patch is relayed back to the vehicle 12 in need. The vehicle 12 then downloads the software patch to fix or mitigate the problem, either temporarily or permanently.

The operation of the system 10 can be illustrated in the following example. Vehicle X is diagnosed with a problem that has a known fix, and the D&P module identifies the problem with a code ID. However, the vehicle is under a situation where the infrastructure is unavailable or inaccessible. Vehicle X then queries other vehicles, say Vehicle Y, using V2V communications, for example, designated short-range communication (DSRC), etc. If vehicle Y has the fix, it would upload it to vehicle X using V2V. However, it is also likely that Vehicle Y may not have the exact software patch that Vehicle X needs. Under this situation, alternatively, Vehicle Y can send the request (pinging over other vehicles with V2V capability) until it reaches a vehicle which has the software fix (say Vehicle Y_a). Then, the service center can send the software fix to Vehicle Y_a. Vehicle Y_a pings it back (through other Vehicle Ys) to Vehicle X.

The software patch to be transferred to the vehicle 12 in need could be a small patch, but could also be fairly sizeable. In the process of facilitating the transfer of the software patch, vehicles are constantly moving, and one or some of the vehicles involved in the original communication to relay the inquiries could have moved out of range when the software patch is finally found. Therefore, novel communication protocols to resolve the loss of data is also needed. In this invention, a method for utilizing the differential speeds of moving vehicles is also proposed.

Each vehicle that is part of the network has a local memory. Slow moving and stopped vehicles could receive mass distribution downlink data segments. Moving vehicles could establish peer relationships with peer vehicles moving approximately at the same velocity and use alternative channels to share those packets with peer vehicles. In order to preserve most of the data communication with the least risk of loss, V2V communications may hop from the stopped or slowly moving vehicles to the fastest moving vehicles in small steps of relative speed.

Utilizing the distributed database also facilitates effective communication for the vehicle in need, especially when the penetration of the V2V and V2I communications is in its lower level. A distributed database can be established with a small number of vehicles loaded with DVD, or DVD-like, files to be accessed by peer vehicles. These vehicles may serve as seeds to the system with a peer-to-peer network for communication with other vehicles in the traffic.

The availability of the software patches in this system closes the loop on the issues of customers need. A variety of software patches may be provided under this system to perform autonomous vehicle maintenance and repair.

The on-board module 14 can be equipped with a model-based or data-based vehicle system monitor that estimates vehicle states to compare with vehicle performance deviation from a pre-determined standard. A problem code is generated upon a detection of the deviation, which needs attention for repair or maintenance. After a successful communication to the service center 18 where the comprehensive expert system 20 resides, the analysis by the expert system 20 takes action for cross-functional adaptation. The vehicle downloads the software patch for the needed cross-functional support. In this case for illustration, the vehicle is diagnosed with a significant variation of understeer coefficient, or detected of an impending variation of understeer coefficient, without a clear identification of the source (bushing or tire, or anything else). The expert system 20 decides to take three courses of action simultaneously, namely, maintain the normal steering response using active steering or differential braking with a software patch to augment the chassis control gains, load and activate an enhanced vehicle SOH (state-of-health) monitor and continue to monitor the vehicle heath in the absence of the apparent performance degradation by taking into account the control augmentation provided by the software patch, and facilitate further analysis through interactive control actions with the vehicle to pin-point the source of the problem, and facilitate service at a time most convenient for the customer with minimal disruption of his/her schedule.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for transferring repair messages between vehicles and a service center in a vehicle communications network, said method comprising:

providing a plurality of vehicles in the vehicle network measuring a speed of each of the plurality of vehicles;

identifying a peer vehicle group in the network based on the measured vehicle speeds for transmitting messages between the vehicles so as to prevent a vehicle involved in a software patch download from moving out of a communications range;

providing the service center in wireless communication with the vehicles in the network;

providing an on-board module on at least one of the vehicles in the network;

using the on-board module to monitor vehicle system buses to identify vehicle problems;

transmitting a problem code identifying a problem into the network; and downloading a software upgrade patch to the vehicle with the problem to correct the problem by messages transmitted through the network.

2. The method according to claim 1 wherein downloading the software upgrade patch to the vehicle with the problem includes downloading the software upgrade patch directly from the service center.

3. The method according to claim 1 wherein downloading the software upgrade patch to the vehicle with the problem includes downloading the software upgrade patch directly from another vehicle in the network that has the software patch stored in a database on the vehicle.

4. The method according to claim 1 wherein downloading the software upgrade patch to the vehicle with the problem includes downloading the software upgrade patch from the service center through other vehicles in the network.

5. The method according to claim 1 wherein downloading the software upgrade patch to the vehicle with the problem includes downloading the software upgrade patch from a vehicle in the network that has the software patch stored in a database on the vehicle through other vehicles in the network.

6. The method according to claim 1 wherein the service center includes an expert system that includes an algorithm for identifying the problem code and an associated software upgrade for that problem code.

7. The method according to claim 1 further comprising storing the upgraded software patch in a database on the vehicle that included the problem.

8. A method for transferring repair messages between and among vehicles and a service center in a vehicle communications network, said method comprising:

measuring the speed of each vehicle;

identifying a peer vehicle group in the network based on the measured vehicle speeds for transmitting messages between the vehicles so as to prevent a vehicle involved in a software patch download from moving out of a communications range;

identifying a problem on one of the vehicles and identifying a problem code for that problem;

wirelessly transmitting a message from the vehicle with the problem including a request for a software upgrade patch that will correct the problem associated with the problem code;

passing the message between and among the vehicles and the service center; and receiving a message with the software upgrade patch at the vehicle with the problem through the vehicle network.

9. The method according to claim 8 wherein transmitting the message with the request and receiving the message with the software upgrade patch includes transmitting the message directly to the service center and receiving the software upgrade patch directly back from the service center.

10. The method according to claim 8 wherein transmitting the message with the request and receiving the message with the software upgrade patch includes transmitting the message through a plurality of vehicles to the service center and receiving the software upgrade patch back from the service center through a plurality of vehicles.

11. The method according to claim 8 wherein transmitting the message with the request and receiving the message with the software upgrade patch includes transmitting the message directly to one of the vehicles and receiving the software patch directly back from the one vehicle.

12. The method according to claim 8 wherein transmitting the message with the request and receiving the message with the software upgrade patch includes transmitting the message through a plurality of vehicles to one vehicle that includes the software upgrade patch and receiving the software upgrade patch from the one vehicle through a plurality of vehicles.

13. A system for transferring repair messages between vehicles and a service center in a vehicle communications network, said method comprising:

a plurality of vehicles associated with the vehicle network wherein the speed of each vehicle is measured and the network identifies a peer vehicle group based on the measured vehicle speeds for transmitting messages between the vehicles so as to prevent a vehicle involved in a software patch download from moving out of a communications range;

a service center in wireless communication with at least a plurality of the plurality of vehicles in the network;

an on-board module on at least one of the vehicles in the network, said on-board module monitoring vehicle system buses to identify problems; and a telematics unit that transmits a message requesting a software upgrade patch for an identified problem where the message includes a problem code identifying the problem, said unit receiving the software upgrade patch code.

14. The system according to claim 13 wherein the transmitted message is directly received by the service center and the software upgrade patch is directly received back from the service center.

15. The system according to claim 13 wherein the message is transmitted through a plurality of vehicles to the service center and the received software upgrade patch is received back from the service center through a plurality of vehicles.

16. The system according to claim 13 wherein the transmitted message is received directly by one of the vehicles in the network and the software upgrade patch is received directly back from the one vehicle.

17. The system according to claim 13 wherein the transmitted message is transmitted through a plurality of vehicles to one vehicle that includes the software upgrade patch and the software upgrade patch is received from the one vehicle through a plurality of vehicles.

* * * * *